United States Patent
Oberg et al.

(10) Patent No.: US 11,921,907 B2
(45) Date of Patent: Mar. 5, 2024

(54) DETECTING SECURITY VULNERABILITIES INTRODUCED BETWEEN VERSIONS OF A HARDWARE DESIGN

(71) Applicant: Cycuity, Inc., San Jose, CA (US)

(72) Inventors: Jason K. Oberg, Redwood City, CA (US); Kristoffer Wilkerson, San Francisco, CA (US); Vijay Seshadri, San Jose, CA (US)

(73) Assignee: Cycuity, Inc., San Jose, CA (US)

( * ) Notice: Subject to any disclaimer, the term of this patent is extended or adjusted under 35 U.S.C. 154(b) by 385 days.

(21) Appl. No.: 17/086,059

(22) Filed: Oct. 30, 2020

(65) Prior Publication Data

US 2022/0138351 A1 May 5, 2022

(51) Int. Cl.
| | |
|---|---|
| *G06F 21/70* | (2013.01) |
| *G06F 21/54* | (2013.01) |
| *G06F 21/57* | (2013.01) |
| *G06F 21/76* | (2013.01) |
| *G06F 30/33* | (2020.01) |
| *G06F 30/34* | (2020.01) |

(52) U.S. Cl.
CPC ............ *G06F 21/76* (2013.01); *G06F 21/54* (2013.01); *G06F 21/577* (2013.01); *G06F 30/33* (2020.01); *G06F 30/34* (2020.01)

(58) Field of Classification Search
CPC ........ G06F 21/76; G06F 21/54; G06F 21/577; G06F 30/33; G06F 30/34; G06F 21/70
See application file for complete search history.

(56) References Cited

U.S. PATENT DOCUMENTS

| | | | |
|---|---|---|---|
| 9,305,166 B2 | 4/2016 | Kastner et al. | |
| 10,289,873 B2 * | 5/2019 | Oberg | ............... G06F 30/337 |
| 10,558,771 B2 | 2/2020 | Blair et al. | |
| 10,719,631 B2 | 7/2020 | Hu et al. | |
| 2008/0127015 A1 * | 5/2008 | Chandramouli | ........ G06F 30/33 |
| | | | 716/109 |
| 2013/0074023 A1 * | 3/2013 | Millendorf | ............. G06F 30/33 |
| | | | 716/112 |
| 2014/0259161 A1 | 9/2014 | Kastner et al. | |
| 2016/0026801 A1 | 1/2016 | Kastner et al. | |
| 2017/0316227 A1 | 11/2017 | Oberg et al. | |
| 2018/0032760 A1 | 2/2018 | Hu et al. | |
| 2019/0005173 A1 | 1/2019 | Blair et al. | |
| 2022/0138351 A1 | 5/2022 | Oberg et al. | |

OTHER PUBLICATIONS

Choudhury et al., "RTL CDC Is no Longer Enough—How Gate-Level CDC Is Now Essential to First Pass Success," Verification Horizons, Jun. 2017, 13(2), 8 pages.

* cited by examiner

*Primary Examiner* — Nghia M Doan
(74) *Attorney, Agent, or Firm* — Fish & Richardson P.C.

(57) ABSTRACT

Methods, systems, and apparatus, including computer programs encoded on computer storage media, for identifying security vulnerabilities introduced by transformations to a hardware design. One of the methods includes obtaining a security model for an initial electronic hardware design and a modified electronic hardware design. An analysis process is performed on the initial representation and on the modified representation of the electronic hardware design according to the security model. If the modified electronic hardware design introduced a security vulnerability relative to the initial electronic hardware design, information representing the introduced security vulnerability is provided.

22 Claims, 4 Drawing Sheets

DETECTING SECURITY VULNERABILITIES INTRODUCED BETWEEN VERSIONS OF A HARDWARE DESIGN

BACKGROUND

This specification relates to techniques for automatically identifying security vulnerabilities introduced by transformations of designs of hardware devices.

A design of a hardware device can be modified or transformed into a functionally equivalent representation for many different purposes. As one example, a logic optimization tool can be used to create a new version of a design that is optimized for certain purposes, such as speed, cost, device size, or device complexity. As another example, a design can be modified through a synthesis tool in order to synthesize the design for use in a real device, e.g., an FPGA device, an ASIC, or another kind of integrated circuit. As yet another example, an engineer may want to reconfigure a design in such a way to meet timing constraints, power constraints, or other design metric criteria. As yet another example, a hardware design can be modified through synthesis, placement, and routing stages of generating a netlist for implementing a design on an FPGA.

FIG. 1 illustrates an example of an initial prior art hardware design 100a of a prior art device known as a clock domain crossing synchronizer. A prior art modified design modifies the initial hardware design 100a of the clock domain crossing synchronizer. FIG. 1 is an illustrations of a register-transfer level (RTL) representation of the clock domain crossing synchronizer.

The initial design 100a includes a multiplexor 110. The transformation decomposes the multiplexor 110 into a group of devices that perform the functional equivalent as the multiplexor 110.

However, functional equivalence alone does not guarantee security equivalence. There very well may be security vulnerabilities in the modified design, meaning that the modification is not as secure as the original even though it performs the same function. In fact, in many cases, hardware design transformations introduce security vulnerabilities that were absent in the original design. But finding such security vulnerabilities is generally quite difficult using manual inspection, particularly for the extremely sophisticated designs of modern electronic devices.

Moreover, defining what should be considered a security vulnerability is an unsolvable problem because different hardware designs will have different security vulnerabilities. For example, a design having a device that generates decryption keys might have more stringent and more numerous security concerns than another design that simply performs clock domain synchronization.

SUMMARY

This specification describes how a system can automatically identify security vulnerabilities that were introduced by a transformation to a functionally equivalent hardware design.

Particular embodiments of the subject matter described in this specification can be implemented so as to realize one or more of the following advantages. A system can automatically detect and identify security vulnerabilities that are introduced by transformations to an initial hardware design. This process can be used to improve the security of hardware designs, e.g., by generating notifications that indicate the presence of detected security vulnerabilities or by automatically scoring or rejecting candidate designs that introduce such vulnerabilities.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a system can use a security model to automatically identify security vulnerabilities that were introduced by a transformation to a hardware design.

Figure 2:
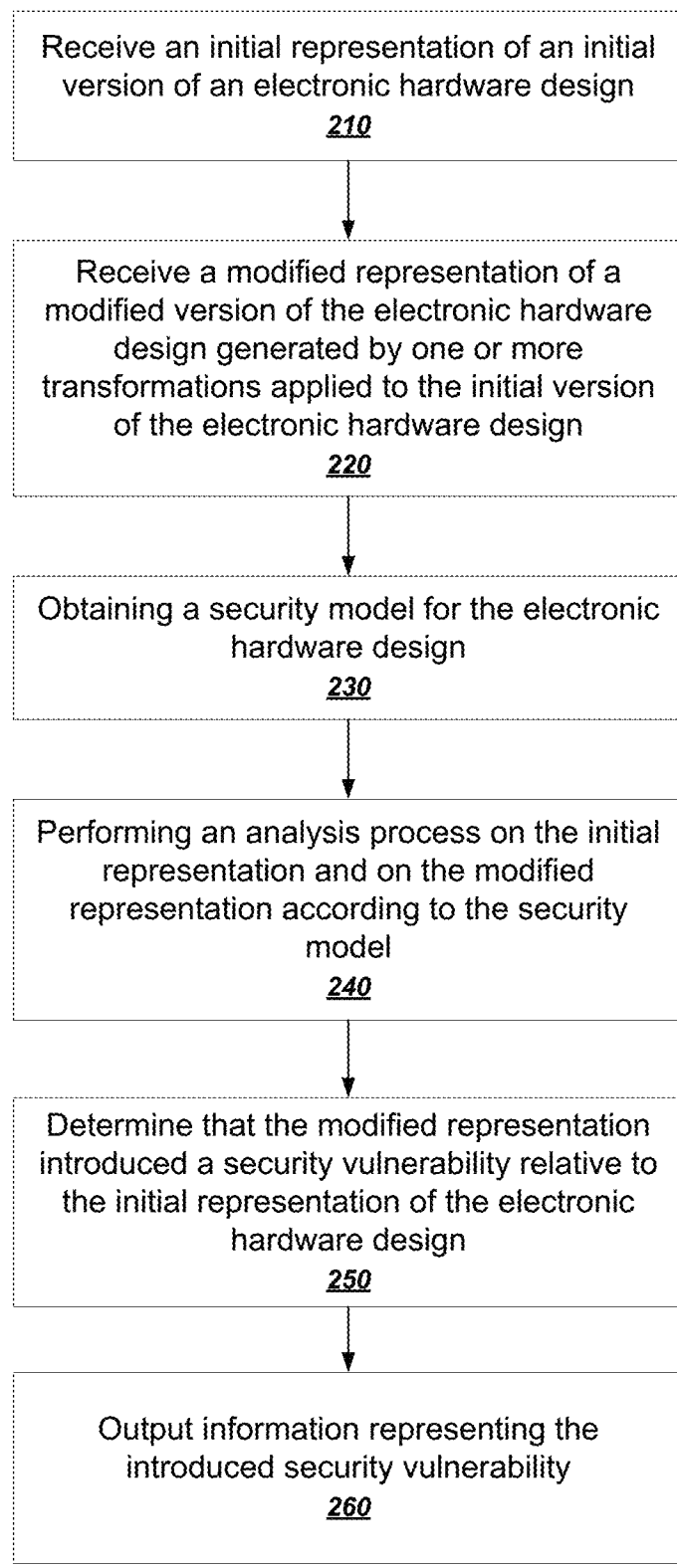
FIG. 2 is a flowchart of an example process for identifying security vulnerabilities introduced by a transformation to a hardware design.

FIG. 2 is a flowchart of an example process for identifying security vulnerabilities introduced by a transformation to a hardware design. The process can be performed by software installed on any appropriate computer system configured to analyze differences between hardware designs. The example process will be described as being performed by a system of one or more computers.

The system receives an initial representation of an initial electronic hardware design (210). The initial electronic hardware design can be in any appropriate format, e.g., RTL or VHDL, to name just two examples.

The system receives a modified representation of a modified electronic hardware design generated by one or more transformations applied to the initial version of the electronic hardware design (220). As described above, the system can analyze any appropriate transformation between two hardware designs. The transformations can be manual or automatic transformations. As one example, the transformation can be a transformation that preserves functional equivalence between one or more inputs and one or more outputs of the design. As another example, the transformation can be between a first version of a design and a subsequent version of the design. However, the designs need not have any kind of relationship at all for the system to analyze modifications for introduced security vulnerabilities.

The system obtains a security model for the initial electronic hardware design and the modified electronic hardware design (230). In this specification, a security model is data that represents one or more properties of or relationships between entities in a hardware design that should hold or should not hold under certain conditions. A security model can be specified using a security specification, which can be written in a high-level security language. For example, security properties can be expressed in the Tortuga Logic Sentinel language, which is described in more detail in commonly-owned U.S. Pat. No. 10,289,873, which is herein incorporated by reference.

A security model can represent several possible security properties of entities in a hardware design. As one example, a security model can specify an information flow relationship, which represents that data passing through one entity in the design should, or should not, flow through another entity in the design. For example, an information flow relationship for the design 100a in FIG. 1 can specify that data flowing into the IN_A input 112 should never flow to the data output 114. As another example, a security model can specify properties of power usage by one or more entities in the design. For example, the model can specify that two entities should never have a power difference that is greater than a certain threshold power measure. As another example, a security model can be written to specify properties related to side channel leakage, hardware Trojans, or other unintended design flaws. Other example security models, as well as how they can be specified in a high-level security language, are described in commonly owned U.S. Pat. Nos. 10,719,631; 10,289,873; and 10,558,771, which are all herein incorporated by reference. The security model can also be expressed as one or more constraints on a design. For example, from a security specification, the system can generate security constraints for a design that must hold for one or more downstream transformations of the design, which can include, for example, logic synthesis, layout, and other post-synthesis design processes.

The system performs an analysis process on the initial representation and on the modified representation according to the security model (240). For example, the system can perform a simulation under various stimuli to the hardware design to verify that the design conforms to the security model or to find anomalies that violate the security model. Other example analysis processes include emulation, structural analysis, formal verification or testing, power analysis, or analyzing the behavior of one or more prototypes.

The system determines that the modified representation introduced a security vulnerability relative to the initial representation of the electronic hardware design (250), and outputs information representing the introduced security vulnerability. For example, if the initial representation conforms to the security model but an anomaly that violates the security model is found in the modified representation, the system can generate a notification or a graphical representation describing the anomaly to be presented in a graphical user interface presentation.

If the security model was expressed as a constraint on an initial design, after each of one or more downstream transformations are applied, the system can use the security constraints to verify that none of the transformations introduced a vulnerability that violates the original security specification. Each downstream transformation can take the security constraints as an input to verify, or refute, that the output of the transformation satisfies the input security constraints. For example, if a hardware design was verified to not contain vulnerabilities and other issues detailed in a security specification, then transformation of the design to another representation, such as through logic optimization, can be constrained to ensure that the security specification is upheld in the resulting design.

In some implementations, the system can generate such information only for security vulnerabilities that were specifically introduced in the modified design. In other words, the system can be configured to ignore, or place less emphasis on, security vulnerabilities that were already present in the initial design. For example, such vulnerabilities might have been generated further upstream in the design process and deemed to be acceptable. Thus, the system can alternatively or in addition identify a first set of security vulnerabilities existing in the initial design and a second set of security vulnerabilities existing in the modified design. The system can then deem security vulnerabilities as being introduced by the modified design as those security vulnerabilities that exist in the second set but not the first set. Performing this kind of differentiation can help limit the amount of information that needs to be generated and helps designers to focus on problems existing specifically with the transformation that generated the modified design and not all other transformations and processes that were involved in the overall design process.

The system can also use the output as part of an integrated design process. For example, the system can use the mere fact that a security vulnerability was introduced in order to score or reject candidate designs. For example, automated design tools can generate multiple different candidate designs. The system can then perform the example process to determine whether any of the candidate designs have introduced security vulnerabilities and can reject those designs. If no valid designs remain, the system can iterate again to perform other transformations to generate additional candidate designs.

Alternatively or in addition, the system can score candidate designs according to how many security vulnerabilities were introduced relative to the initial design. For example, the system can rank, e.g., in a user interface presentation, a modified design that introduces only two security vulnerabilities higher than an alternative design that introduces 10 security vulnerabilities.

Figure 3:
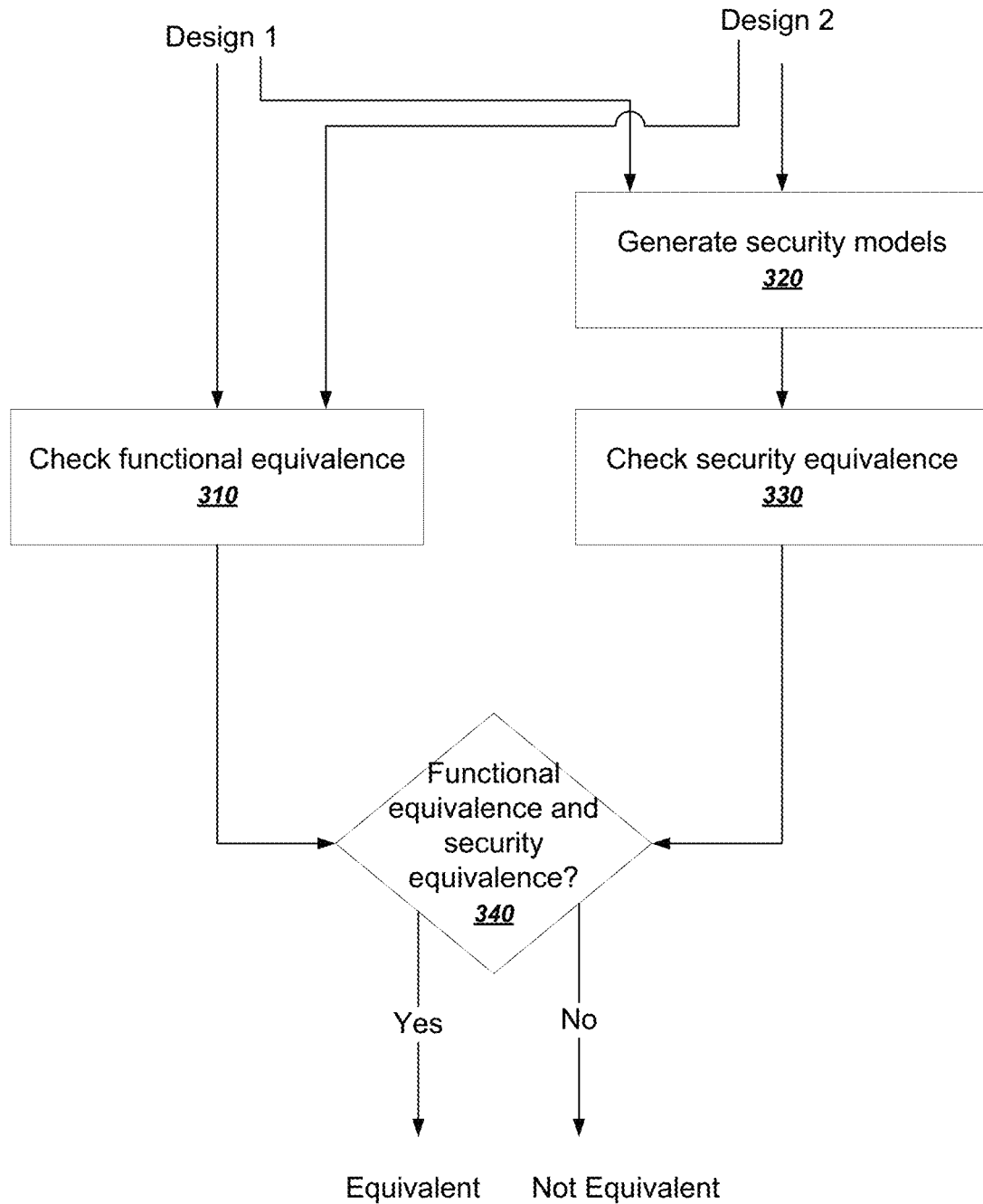
FIG. 3 is a flowchart of an example integrated design process.

FIG. 3 is a flowchart of an example integrated design process. FIG. 3 illustrates how a system can integrate the concept of security equivalence into the overall concept of circuit designs being equivalent. In other words, the system can treat two designs as being equivalent if and only if they have both functional equivalence and security equivalence. To do so, after a modified design is generated, the system can perform the equivalence check illustrated in FIG. 3.

The system can check functional equivalence (310) using any appropriate simulation tool to verify that the modified design, design 2, performs the same function as the initial design, design 1, under the same range of inputs.

The system can also independently generate security models for the designs (320) and check their security equivalence (330), e.g., by determining whether design 2 introduced security vulnerabilities that were absent in design 1.

The system can then determine that design 1 is equal to design 2 if and only if they are both equal in functional equivalence and security equivalence (340). This integrated concept of design equivalence can also be used in an iterative design process as described above, e.g., to reject or to score candidate designs generated by one or more transformations.

Figure 4:
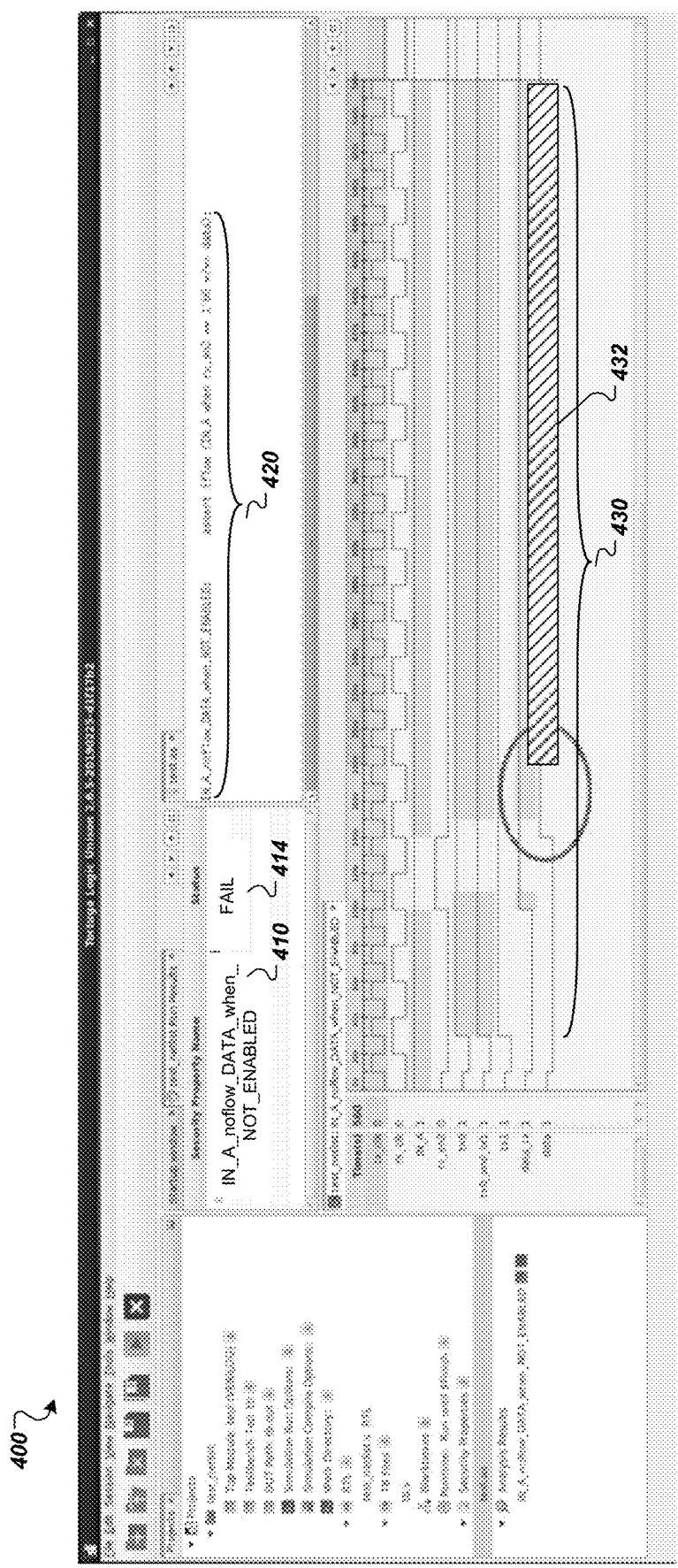
FIG. 4 is a diagram of an example graphical user interface presentation.

FIG. 4 is a diagram of an example graphical user interface presentation 400 that highlights security vulnerabilities introduced by a modified design. In this example, the user interface presentation 400 represents the results of an information flow security analysis of a design illustrated by FIG. 1.

The user interface presentation 400 includes a trace pane 430 that shows several traces. Each trace in the trace pane 430 corresponds to a named data path illustrated in FIG. 1.

The user interface presentation 400 also includes a security model pane 420, which can be used to display and edit a security property of the security model. In this example, the security property is specified in a high-level security language. The security property references the names of data path entities that are being tracked by the system as part of the security analysis.

In this example, the security model specifies the following security property in the high-level security language:

assert iflow (IN_A when rx_en2==1'b0=/=>data);

This statement means that when rx_en2 is not enabled, e.g., by having value 1'b0, data received at IN_A should not be received at data. This property is specified in the high-level language using the does not flow operator, "=/=>". This is essentially a way to specify that IN_A is a secured asset in the design.

This statement, when parsed by the system, gets a name to represent the security property. The system can generate any appropriate name for the security property. In this example, the system generated the name, "IN_A_noflow_DATA_when_NOT_ENABLED."

Figure 1:
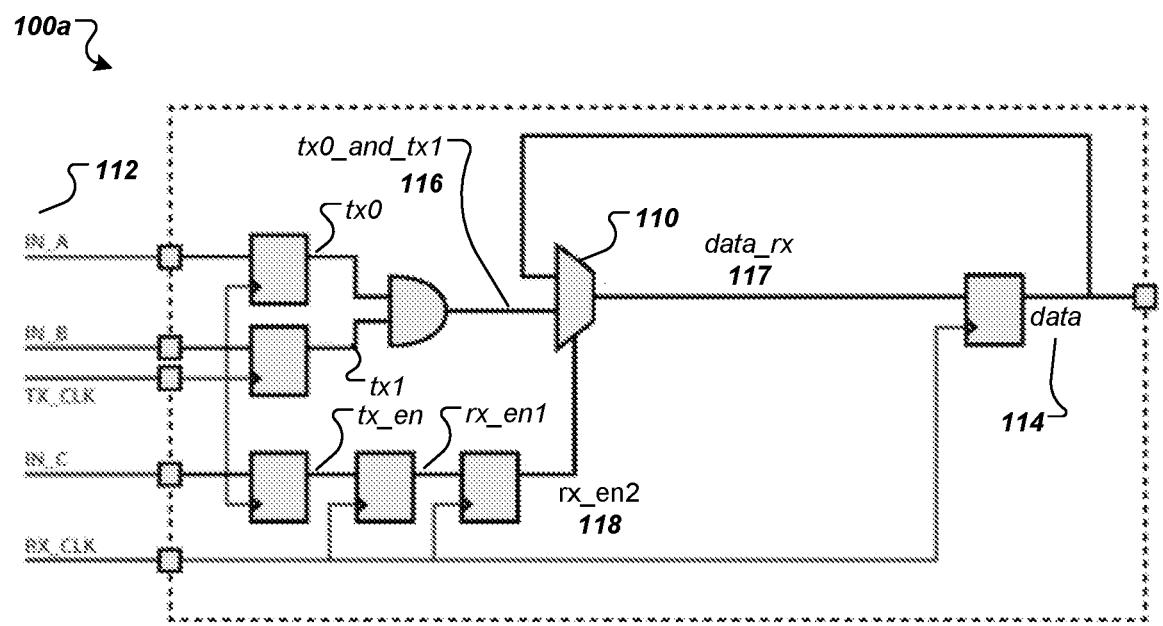
FIG. 1 illustrates an example of an initial design of a clock domain crossing synchronizer.

In FIG. 1, the initial design of the clock domain crossing synchronizer conforms to this security property. If the control line to the mux 110, rx_en2 118, is held at 1'b0, the data output 114 will never see the data_rx 117 data path having the value of tx0_and_tx1 116. Instead, it will feedback the value of data 114.

This security property is violated by the modified design. Although the transformation of the mux-based synchronizer to combinational logic is logically correct, one of the AND gates can be missing an input referencing rx_en2 118, which can propagate a glitch from the asynchronous transmit domain. The missing term thus allows a glitch to occur from IN_A 112 to the data output 114.

Therefore, the system can output information to indicate that the transformation from the initial design in FIG. 1 to the modified design introduced a security vulnerability. In this example, the system presents this information in a security property pane 410, which indicates that the security property "IN_A_noflow_DATA_when_NOT_ENABLED" is violated by the modified design. The security property pane 410 thus includes a status 414 of "FAIL."

The presentation 400 also includes a visual indication of when and under what inputs the failed security property occurred. In this example, the presentation 400 visually distinguishes the trace with a special indicator 432 that illustrates when the security property was violated. As described above, this information can be used by a designer to aid in the design process, or the system could use this information to automatically reject the modified design.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

In addition to the embodiments described above, the following embodiments are also innovative:

Embodiment 1 is a method comprising:
receiving an initial representation of an initial electronic hardware design;
receiving a modified representation of a modified electronic hardware design generated by one or more transformations applied to the initial electronic hardware design;
obtaining a security model for the initial electronic hardware design and the modified electronic hardware design;
performing an analysis process on the initial representation and on the modified representation of the electronic hardware design according to the security model;
determining, from performing the analysis process on the initial representation and the modified representation, that the modified electronic hardware design introduced a security vulnerability relative to the initial electronic hardware design; and
in response, outputting information representing the introduced security vulnerability.

Embodiment 2 is the method of embodiment 1, wherein the security model specifies one or more security properties of one or more entities in a hardware design.

Embodiment 3 is the method of any one of embodiments 1-2, wherein determining that the modified electronic hardware design introduced a security vulnerability relative to the initial electronic hardware design comprises:
determining that the initial electronic hardware design conforms to the security property; and
determining that the modified electronic hardware design violates the security property.

Embodiment 4 is the method of embodiment 3, wherein determining that the modified electronic hardware design introduced a security vulnerability relative to the initial electronic hardware design comprises ignoring security vulnerabilities present in the initial electronic hardware design.

Embodiment 5 is the method of any one of embodiments 1-4, wherein the information representing the introduced security vulnerability comprises an indication that the modified design introduced at least one security vulnerability.

Embodiment 6 is the method of embodiment 5, further comprising:
using the indication that the modified design introduced at least one security vulnerability to reject the modified design as a candidate.

Embodiment 7 is the method of any one of embodiments 1-6, wherein the modified electronic hardware design is functionally equivalent to the initial electronic hardware design after the one or more transformations are applied to the initial electronic hardware design.

Embodiment 8 is the method of any one of embodiments 1-7, wherein outputting information representing the introduced security vulnerability comprises:
generating a graphical user interface presentation; and
presenting information representing the introduced security vulnerability.

Embodiment 9 is the method of embodiment 8, wherein presenting information representing the introduced security vulnerability comprises visually distinguishing a trace in a trace pane for an entity corresponding to the introduced security vulnerability.

Embodiment 10 is the method of any one of embodiments 1-9, wherein the security model is specified using a high-level security language.

Embodiment 11 is the method of any one of embodiments 1-10, wherein the analysis process is a structural analysis, formal verification or testing, simulation, power analysis, emulation, or analysis of one or more prototypes for the electronic hardware design.

Embodiment 12 is the method of any one of embodiments 1-11, wherein the security model comprises a constraint on the initial hardware design that must hold through one or more downstream transformations.

Embodiment 13 is a system comprising: one or more computers and one or more storage devices storing instructions that are operable, when executed by the one or more computers, to cause the one or more computers to perform the method of any one of embodiments 1 to 12.

Embodiment 14 is a computer storage medium encoded with a computer program, the program comprising instructions that are operable, when executed by data processing apparatus, to cause the data processing apparatus to perform the method of any one of embodiments 1 to 12.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving an initial representation of an initial electronic hardware design;
   receiving a modified representation of a modified electronic hardware design generated by one or more transformations applied to the initial electronic hardware design;
   obtaining a security model for the initial electronic hardware design and the modified electronic hardware design;
   performing an analysis process on the initial representation of the electronic hardware design and on the modified representation of the electronic hardware design according to the security model;
   determining, from performing the analysis process on the initial representation and the modified representation, that the modified electronic hardware design introduced a security vulnerability relative to the initial electronic hardware design;
   in response, outputting information representing the introduced security vulnerability, wherein the information representing the introduced security vulnerability comprises an indication that the modified electronic hardware design introduced at least one security vulnerability; and
   using the indication that the modified electronic hardware design introduced at least one security vulnerability to reject the modified electronic hardware design as a candidate.

2. The method of claim 1, wherein the security model specifies one or more security properties of one or more entities in a hardware design.

3. The method of claim 2, wherein determining that the modified electronic hardware design introduced a security vulnerability relative to the initial electronic hardware design comprises:
   determining that the initial electronic hardware design conforms to a security property of the security model; and
   determining that the modified electronic hardware design violates the security property.

4. The method of claim 3, wherein determining that the modified electronic hardware design introduced a security vulnerability relative to the initial electronic hardware design comprises ignoring security vulnerabilities present in the initial electronic hardware design.

5. The method of claim 1, wherein the modified electronic hardware design is functionally equivalent to the initial electronic hardware design after the one or more transformations are applied to the initial electronic hardware design.

6. The method of claim 1, wherein outputting information representing the introduced security vulnerability comprises:
   generating a graphical user interface presentation; and
   presenting information representing the introduced security vulnerability.

7. The method of claim 6, wherein presenting information representing the introduced security vulnerability comprises visually distinguishing a trace in a trace pane for an entity corresponding to the introduced security vulnerability.

8. The method of claim 1, wherein the security model is specified using a high-level security language.

9. The method of claim 1, wherein the analysis process is a structural analysis, formal verification or testing, simulation, power analysis, emulation, or analysis of one or more prototypes for the electronic hardware design.

10. The method of claim 1, wherein the security model comprises a constraint on the initial hardware design that must hold through one or more downstream transformations.

11. A system comprising:
    one or more computers and one or more storage devices storing instructions that are operable, when executed by the one or more computers, to cause the one or more computers to perform operations comprising:
    receiving an initial representation of an initial electronic hardware design;
    receiving a modified representation of a modified electronic hardware design generated by one or more transformations applied to the initial electronic hardware design;
    obtaining a security model for the initial electronic hardware design and the modified electronic hardware design;
    performing an analysis process on the initial representation of the electronic hardware design and on the modified representation of the electronic hardware design according to the security model;
    determining, from performing the analysis process on the initial representation and the modified representation, that the modified electronic hardware design introduced a security vulnerability relative to the initial electronic hardware design;
    in response, outputting information representing the introduced security vulnerability, wherein the information representing the introduced security vulnerability comprises an indication that the modified electronic hardware design introduced at least one security vulnerability; and using the indication that the modified electronic hardware design introduced at least one security vulnerability to reject the modified electronic hardware design as a candidate.

12. The system of claim 11, wherein the security model specifies one or more security properties of one or more entities in a hardware design.

13. The system of claim 12, wherein determining that the modified electronic hardware design introduced a security vulnerability relative to the initial electronic hardware design comprises:

determining that the initial electronic hardware design conforms to a security property of the security model; and determining that the modified electronic hardware design violates the security property.

14. The system of claim 13, wherein determining that the modified electronic hardware design introduced a security vulnerability relative to the initial electronic hardware design comprises ignoring security vulnerabilities present in the initial electronic hardware design.

15. The system of claim 11, wherein the modified electronic hardware design is functionally equivalent to the initial electronic hardware design after the one or more transformations are applied to the initial electronic hardware design.

16. One or more non-transitory computer storage media encoded with computer program instructions that when executed by one or more computers cause the one or more computers to perform operations comprising:

receiving an initial representation of an initial electronic hardware design;

receiving a modified representation of a modified electronic hardware design generated by one or more transformations applied to the initial electronic hardware design;

obtaining a security model for the initial electronic hardware design and the modified electronic hardware design;

performing an analysis process on the initial representation of the electronic hardware design and on the modified representation of the electronic hardware design according to the security model;

determining, from performing the analysis process on the initial representation and the modified representation, that the modified electronic hardware design introduced a security vulnerability relative to the initial electronic hardware design;

in response, outputting information representing the introduced security vulnerability, wherein the information representing the introduced security vulnerability comprises an indication that the modified electronic hardware design introduced at least one security vulnerability; and using the indication that the modified electronic hardware design introduced at least one security vulnerability to reject the modified electronic hardware design as a candidate.

17. A computer-implemented method comprising:
receiving an initial representation of an initial electronic hardware design;

receiving a modified representation of a modified electronic hardware design generated by one or more transformations applied to the initial electronic hardware design;

obtaining a security model for the initial electronic hardware design and the modified electronic hardware design;

performing an analysis process on the initial representation and on the modified representation of the electronic hardware design according to the security model;

determining, from performing the analysis process on the initial representation and the modified representation, that the modified electronic hardware design introduced a security vulnerability relative to the initial electronic hardware design;

generating a graphical user interface presentation; and presenting information representing the introduced security vulnerability within the graphical user interface presentation including visually distinguishing a trace in a trace pane for an entity corresponding to the introduced security vulnerability.

18. The method of claim 17, wherein determining that the modified electronic hardware design introduced a security vulnerability relative to the initial electronic hardware design comprises:

determining that the initial electronic hardware design conforms to a security property of the security model; and determining that the modified electronic hardware design violates the security property.

19. The method of claim 18, wherein determining that the modified electronic hardware design introduced a security vulnerability relative to the initial electronic hardware design comprises ignoring security vulnerabilities present in the initial electronic hardware design.

20. A system comprising:
one or more computers and one or more storage devices storing instructions that are operable, when executed by the one or more computers, to cause the one or more computers to perform operations comprising:

receiving an initial representation of an initial electronic hardware design;

receiving a modified representation of a modified electronic hardware design generated by one or more transformations applied to the initial electronic hardware design;

obtaining a security model for the initial electronic hardware design and the modified electronic hardware design;

performing an analysis process on the initial representation and on the modified representation of the electronic hardware design according to the security model;

determining, from performing the analysis process on the initial representation and the modified representation, that the modified electronic hardware design introduced a security vulnerability relative to the initial electronic hardware design;

generating a graphical user interface presentation; and presenting information representing the introduced security vulnerability within the graphical user interface presentation including visually distinguishing a trace in a trace pane for an entity corresponding to the introduced security vulnerability.

21. The system of claim 20, wherein determining that the modified electronic hardware design introduced a security vulnerability relative to the initial electronic hardware design comprises:

determining that the initial electronic hardware design conforms to a security property of the security model; and determining that the modified electronic hardware design violates the security property.

22. The system of claim 21, wherein determining that the modified electronic hardware design introduced a security vulnerability relative to the initial electronic hardware design comprises ignoring security vulnerabilities present in the initial electronic hardware design.

\* \* \* \* \*